United States Patent
Pearce

(10) Patent No.: US 11,547,218 B2
(45) Date of Patent: Jan. 10, 2023

(54) METHODS FOR PACKAGING CUSHIONS WITH ELASTOMERIC CUSHIONING ELEMENTS

(71) Applicant: Purple Innovation, LLC, Lehi, UT (US)

(72) Inventor: Tony M. Pearce, Alpine, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 16/872,223

(22) Filed: May 11, 2020

(65) Prior Publication Data

US 2020/0268162 A1 Aug. 27, 2020

Related U.S. Application Data

(62) Division of application No. 15/062,674, filed on Mar. 7, 2016, now abandoned.

(51) Int. Cl.
*A47C 27/08* (2006.01)
*A47C 27/14* (2006.01)
(Continued)

(52) U.S. Cl.
CPC .......... *A47C 27/085* (2013.01); *A47C 27/086* (2013.01); *A47C 27/14* (2013.01);
(Continued)

(58) Field of Classification Search
CPC ..... A47C 27/00; A47C 27/085; A47C 27/086; A47C 27/14; A47C 27/142; A47C 27/144;
(Continued)

(56) References Cited

U.S. PATENT DOCUMENTS 2,617,751 A 11/1952 Bickett
3,049,344 A 8/1962 Hawkins
(Continued)

FOREIGN PATENT DOCUMENTS

CN 1468572 A 1/2004
CN 2726430 Y 9/2005
(Continued)

OTHER PUBLICATIONS

Korean Intellectual Property Office, "Grounds for Rejection," Korean Application No. 10-2019-7028936, dated Aug. 31, 2020.
(Continued)

*Primary Examiner* — David R Hare
(74) *Attorney, Agent, or Firm* — Dentons Durham Jones Pinegar

(57) ABSTRACT

A method for packaging a cushion includes coating a cushioning element with a powder while the cushioning element is in an expanded state and then compressing the cushion to a compressed state. As the cushioning element is compressed, the powder prevents surfaces of the cushioning element (e.g., surfaces of intersecting walls that define hollow buckling columns of a cushioning element formed from an elastomeric polymer extended with a plasticizer, etc.) from adhering to each other. The powder may allow the cushioning element to substantially return to its expanded state substantially immediately following removal of a compressive force from the cushioning element.

17 Claims, 4 Drawing Sheets

(51) Int. Cl.
  *B65B 63/02* (2006.01)
  *C09D 123/04* (2006.01)
  *B68G 1/00* (2006.01)
(52) U.S. Cl.
  CPC .......... *A47C 27/142* (2013.01); *A47C 27/144* (2013.01); *B65B 63/02* (2013.01); *B65B 63/026* (2013.01); *B68G 1/00* (2013.01); *C09D 123/04* (2013.01)
(58) Field of Classification Search
  CPC ......... B68G 1/00; B65B 63/02; B65B 63/026; C09D 123/04; C09D 123/06
  See application file for complete search history.

(56) References Cited

U.S. PATENT DOCUMENTS

| | | | |
|---|---|---|---|
| 3,528,841 A * | 9/1970 | Donaldson | C08J 3/124 427/222 |
| 4,369,284 A | 1/1983 | Chen | |
| 4,711,067 A | 12/1987 | Magni | |
| 4,980,940 A | 1/1991 | Isshiki | |
| 4,990,399 A | 2/1991 | Hoopengardner | |
| 5,408,711 A | 4/1995 | McClelland | |
| 5,492,963 A | 2/1996 | Ozawa et al. | |
| 5,638,565 A | 6/1997 | Pekar | |
| 5,749,111 A | 5/1998 | Pearce et al. | |
| 5,994,450 A | 11/1999 | Pearce | |
| 6,026,527 A * | 2/2000 | Pearce | C08L 51/006 5/654 |
| 6,098,378 A * | 8/2000 | Wyatt | B65B 63/026 53/118 |
| 6,328,798 B1 * | 12/2001 | Bostrom | B29B 7/945 118/303 |
| 6,865,759 B2 | 3/2005 | Pearce | |
| 6,898,814 B2 | 5/2005 | Kawamura et al. | |
| 6,901,722 B2 * | 6/2005 | Dextraze | B65B 31/06 206/223 |
| 7,076,822 B2 | 7/2006 | Pearce | |
| 7,666,341 B2 | 2/2010 | Pearce | |
| 7,730,566 B2 | 6/2010 | Flick et al. | |
| 7,823,233 B2 | 11/2010 | Flick et al. | |
| 7,827,636 B2 | 11/2010 | Flick et al. | |
| 7,964,664 B2 | 6/2011 | Pearce | |
| 8,046,973 B2 * | 11/2011 | Petrolati | B65B 63/024 53/118 |
| 8,075,981 B2 | 12/2011 | Pearce et al. | |
| 8,087,726 B2 | 1/2012 | Chen | |
| 8,434,748 B1 | 5/2013 | Pearce et al. | |
| 8,607,387 B2 | 12/2013 | Flick et al. | |
| 8,628,067 B2 | 1/2014 | Pearce et al. | |
| 8,919,750 B2 | 12/2014 | Pearce et al. | |
| 8,932,692 B2 | 1/2015 | Pearce | |
| 9,049,944 B2 * | 6/2015 | Chen | A47C 27/085 |
| 9,796,522 B2 | 10/2017 | Pearce | |
| 2003/0037377 A1 | 2/2003 | Kawamura et al. | |
| 2003/0074863 A1 | 4/2003 | Mossbeck | |
| 2005/0144911 A1 | 7/2005 | Dextraze et al. | |
| 2005/0223667 A1 * | 10/2005 | McCann | A47C 27/146 52/403.1 |
| 2006/0231436 A1 * | 10/2006 | Spinks | B65D 85/07 206/326 |
| 2007/0056096 A1 | 3/2007 | Assink | |
| 2007/0065625 A1 | 3/2007 | Lai | |
| 2007/0245490 A1 * | 10/2007 | Oh | B65B 25/146 5/413 R |
| 2008/0115286 A1 * | 5/2008 | Flick | A61G 7/05738 5/655.5 |
| 2009/0007822 A1 | 1/2009 | Berke et al. | |
| 2010/0227091 A1 | 9/2010 | Pearce | |
| 2011/0061170 A1 | 3/2011 | Farley | |
| 2012/0135652 A1 | 5/2012 | Dandenault et al. | |
| 2013/0000045 A1 | 1/2013 | Losio | |
| 2013/0043628 A1 | 2/2013 | Pearce et al. | |
| 2013/0133138 A1 * | 5/2013 | Sugano | B29D 22/00 5/652 |
| 2013/0167302 A1 * | 7/2013 | Pearce | A47C 7/02 5/739 |
| 2013/0216734 A1 | 8/2013 | Van Pottelbergh et al. | |
| 2014/0208517 A1 | 7/2014 | Gross et al. | |
| 2015/0203221 A1 * | 7/2015 | Van De Hey | B65B 63/02 206/446 |
| 2015/0351557 A1 | 12/2015 | Allen | |
| 2015/0359357 A1 * | 12/2015 | Feng | A47C 27/144 5/699 |
| 2017/0251825 A1 | 9/2017 | Pearce | |
| 2019/0150629 A1 | 5/2019 | Pearce | |
| 2019/0150631 A1 | 5/2019 | Pearce et al. | |
| 2019/0150632 A1 | 5/2019 | Pearce et al. | |

FOREIGN PATENT DOCUMENTS

| | | |
|---|---|---|
| CN | 1727376 A | 2/2006 |
| CN | 101379234 A | 3/2009 |
| CN | 102639635 A | 8/2012 |
| CN | 103214722 A | 7/2013 |
| CN | 103619216 A | 3/2014 |
| JP | SHO52-091080 A | 8/1977 |
| JP | HEI0994133 A | 4/1997 |
| JP | HEI10-248682 A | 9/1998 |
| JP | HEI11299579 A | 11/1999 |
| JP | 2003-210283 A | 7/2003 |
| TW | 201018757 A | 5/2010 |
| WO | 2012148915 A1 | 11/2012 |
| WO | 2015051090 A1 | 4/2015 |
| WO | 2017155820 A1 | 9/2017 |

OTHER PUBLICATIONS

Canadian Intellectual Property Office, "Commissioner's Notice—Application Found Allowable," Canadian Application No. 3,016,702, Dec. 23, 2019.

European Patent Office, "Extended European search report," European Application No. 17763792.3, dated Sep. 4, 2019.

Japan Patent Office, "Final Rejection," Japanese Application No. 2018-545840, dated Jan. 6, 2020.

Japan Patent Office, "Notice of Reasons for Refusal," Japanese Application No. 2018-545840, dated Sep. 4, 2019.

United States Plastics Corp., "What's the difference between LPDE, LLDPE, MDPE, HDPE, XLPE and UHMW sheeting?," https://www.usplastic.com/knowledgebase/article.aspx?contentkey=508, Aug. 13, 2008.

USPTO as International Searching Authority, "International Search Report and Written Opinion," International Application No. PCT/US2017/020726, dated May 29, 2017.

Korean Intellectual Property Office, "Notice of Allowance," Korean Application No. 10-2018-7028893, dated Mar. 18, 2020.

Taiwan Intellectual Property Office, "Notice of Office Action," Taiwan Application No. 106107365, dated May 28, 2020.

Chinese National Intellectual Property Administration, "First Office Action," Chinese Application No. 201780016021.4, dated Jun. 3, 2020.

Taiwan Intellectual Property Office, "Office Action," Taiwan Application No. 107125120, dated Mar. 8, 2019.

European Patent Office, "Extended European Search Report," European Application No. 18835912.9, dated Jun. 29, 2020.

IP Australia, "Examination Report No. 1," Australian Application No. 2018304056, dated Mar. 31, 2020.

Chinese National Intellectual Property Administration, "First Office Action," Chinese Application No. 2018107865369, dated Jan. 20, 2020.

USPTO as International Searching Authority, "International Search Report and Written Opinion," International Application No. PCT/US2018/041455, dated Oct. 17, 2018.

Chinese National Intellectual Property Administration, "Second Office Action," Chinese Application No. 201810786536.9, dated Sep. 15, 2020.

(56) References Cited

OTHER PUBLICATIONS

Canadian Intellectual Property Office, "Examiner's Report," Canadian Application No. 3054345, dated Nov. 5, 2020.
Chinese National Intellectual Property Administration, "Third Office Action," Chinese Application No. 201810786536.9, dated Mar. 4, 2021.
IP Australia, "Examination report No. 1," Australian Application No. 2017228983, dated Oct. 31, 2018.
IP Australia, "Examination report No. 2," Australian Application No. 2017228983, dated Jul. 5, 2019.
IP Australia, "Examination report No. 3," Australian Application No. 2017228983, dated Sep. 24, 2019.
Canadian Intellectual Property Office, "Examiner's Report," Canadian Application No. 3016702, dated Jun. 14, 2019.
Chinese National Intellectual Property Administration, "Second Office Action," Chinese Application No. 201780016021.4, dated Apr. 9, 2021.
Korean Intellectual Property Office, "Notice of Preliminary Rejection," Korean Application No. 10-2018-7028893, dated Sep. 11, 2019.
Ocean Chemical Industry, RuberZol RA 97, Rev 00, Oct. 11, 2008.
Korean Intellectual Property Office, "Notice of Final Rejection," Korean Application No. 10-2019-7028936, dated Apr. 30, 2021.
Canadian Intellectual Property Office, "Commissioner's Notice—Application Found Allowable," Canadian Application No. 3016702, dated Jun. 22, 2021.
Korean Intellectual Property Office, "Notice of Allowance," Korean Application No. 10-2018-7028893, dated Jul. 6, 2021.
Chinese National Intellectual Property Administration, "Third Office Action," Chinese Application No. 201780016021.4, dated Aug. 5, 2021.

* cited by examiner

METHODS FOR PACKAGING CUSHIONS WITH ELASTOMERIC CUSHIONING ELEMENTS

CROSS-REFERENCE TO RELATED APPLICATION

This application is a divisional of U.S. patent application Ser. No. 15/062,674, filed on Mar. 7, 2016 and titled CUSHIONS INCLUDING A COATED ELASTOMERIC CUSHIONING ELEMENT AND RELATED METHODS, the entire disclosure of which is hereby incorporated herein.

TECHNICAL FIELD

Embodiments of the disclosure relate generally to elastomeric cushioning elements for compressible cushions, including mattresses, mattress toppers, seat cushions, etc., to coatings for the cushioning elements, and to methods of forming cushions including coated cushioning elements.

RELATED ART

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

U.S. Pat. No. 7,730,566, "Multi-Walled Gelastic Material," issued Jun. 8, 2010, the disclosure of which is incorporated herein in its entirety by this reference, describes cushion structures having interconnected walls that buckle. A first wall buckles when a threshold force is applied. Buckling of the first wall may cause buckling of a second wall, which may decrease the chance that the first wall will "bottom out." Bottoming out would increase pressure on the portion of the cushioned object over the buckled portion of the cushion. One side of the cushion has walls spaced relatively close together, and the opposite side has walls spaced farther apart. That is, some walls of the cushion extend only partially through the cushion. The wider-spaced portions of the walls may buckle more easily than the closer-spaced portions of the walls when an irregularly shaped object presses against the walls.

U.S. Pat. No. 8,919,750, "Cushioning Elements Comprising Buckling Walls and Methods of Forming Such Cushioning Elements," issued Dec. 30, 2014, the entire disclosure of which is hereby incorporated herein, describes a cushioning element having a top cushioning surface and a bottom base surface, which includes an elastomeric material and a stabilizing material. Interconnected buckling walls formed of the elastomeric material are connected to the stabilizing material.

Cushioning materials, such as mattresses, are generally bulky objects that are difficult and costly to transport from a manufacturer to a retailer or a customer. Traditionally, mattresses have been packaged, shipped, and sold in a flat configuration, such that the mattresses have the same size and dimension in shipping as they do when placed atop a box spring or other mattress support to make a bed. Recently, there have been efforts directed towards compressing mattresses, and there have been methods described for compressing foam and coil mattresses for packaging. Methods have also been disclosed for compressing the foam and coil mattresses into a rolled shape. Examples of methods of roll packing mattresses include: U.S. Pat. No. 8,046,973 to Petrolati, U.S. Patent Application Publication US 2003/0074863 A1 of Mossbeck, and U.S. Patent Application Publication US 2015/0203221 A1 of Van De Hey et al.

SUMMARY

In some embodiments, a cushion includes a cushioning element and a coating provided on a surface of the cushioning element. The cushioning element comprises an elastomeric material forming a plurality of intersecting buckling walls defining a plurality of hollow columns in an expanded form. The elastomeric material comprises an elastomeric polymer and a plasticizer. The coating comprises an olefin powder formulated to hinder adhesion of the elastomeric material when the cushioning element is in a compressed form in which the plurality of intersecting buckling walls are pressed together.

In some embodiments, a compressed cushion includes a cushioning element comprising an elastomeric material and a coating comprising an olefin powder provided on a surface of the cushioning element. The cushioning element is compressed into a cylindrical shape. The elastomeric material comprises an elastomeric polymer and a plasticizer. The olefin powder is formulated to hinder adhesion of the elastomeric material when the cushioning element is compressed.

Methods of forming a cushion are also disclosed. The method includes forming a cushioning element comprising an elastomeric material. The cushioning element comprises a plurality of intersecting buckling walls defining a plurality of hollow columns in an expanded form. The method further includes coating a surface of the cushioning element with an olefin powder. The olefin powder is formulated to hinder adhesion of the plurality of intersecting buckling walls when the cushioning element is compressed by a roll-packing machine into a compressed form and subsequently released from the compressed form to transform to the expanded form.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
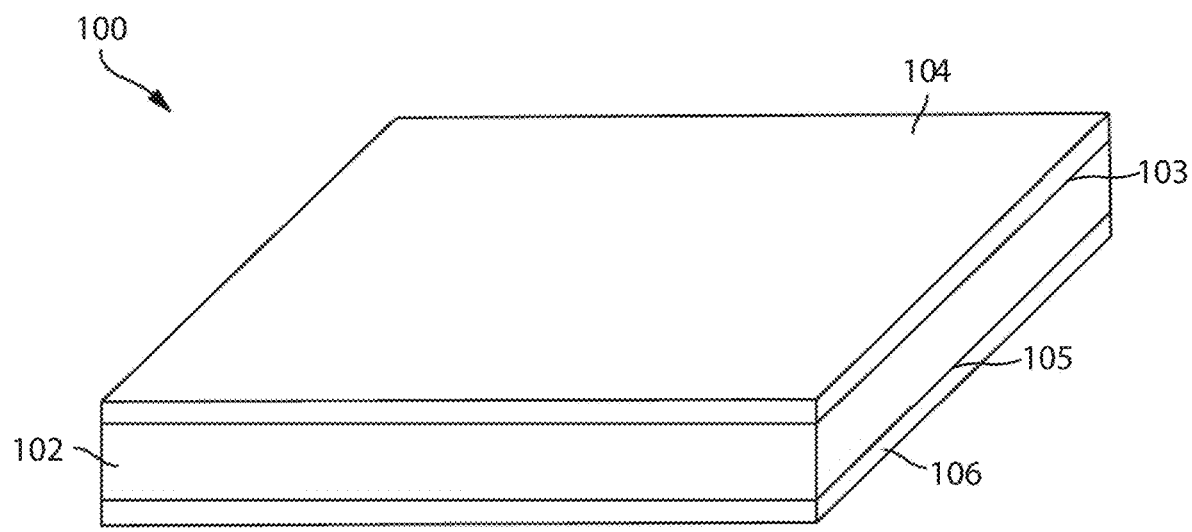
FIG. 1 is a perspective view of a cushion in an expanded form according to an embodiment of the present disclosure.

As used herein, the term "cushioning element" means and includes any deformable device intended for use in cushioning one body relative to another. As a non-limiting example, cushioning elements (e.g., mattresses, seat cushions, etc.) include materials intended for use in cushioning a person, animal, or object relative to another object (e.g., a bed frame, chair seat, etc.) that might otherwise abut against the person, animal or object.

As used herein, the term "elastomeric polymer" means and includes a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term "elastomeric material" means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as "elastomer gels," "gelatinous elastomers," or simply "gels."

As used herein, any relational term, such as "first," "second," "top," "bottom," etc., is used for clarity and convenience in understanding the disclosure and accompanying drawings and does not connote or depend on any specific preference, orientation, or order, except where the context clearly indicates otherwise.

As used herein, the term "and/or" means and includes any and all combinations of one or more of the associated listed items.

The illustrations presented herein are not meant to be actual views of any particular component, device, or system, but are merely idealized representations which are employed to describe embodiments of the present disclosure. Elements common between figures may retain the same numerical designation.

The present disclosure describes a cushion that may be roll-packed, folded, or otherwise compressed for display, storage, and/or shipping to a customer. For example, the cushion may be roll-packed into a cylindrical shape. The roll packed cushion may be provided in a cylindrical bag. Cylindrical bags for shipping roll packed cushions are described in, for example, U.S. Pat. No. 9,796,522, issued on Oct. 24, 2017 and titled "Bag for Shipping a Cushion and Related Methods" ("the '522 patent"), the entire disclosure of which is hereby incorporated herein. Cushions compressed and disposed in cylindrical bags may be easier to handle than cushions, such as mattresses that are traditionally packaged, shipped, and sold in a flat configuration.

FIG. 1 illustrates a perspective view of a cushion 100 according to some embodiments of the present disclosure. The cushion 100 may comprise an elastomeric cushioning element 102 between a top layer 104 and a bottom layer 106. The top layer 104 may be provided on (e.g., attached to) a top surface 103 of the elastomeric cushioning element 102. The bottom layer 106 may be provided on a bottom surface 105 of the elastomeric cushioning element 102.

In some embodiments, the top layer 104 and the bottom layer 106 may comprise a foam material. In other embodiments, the top layer 104 may comprise a stretchable material that may be secured to or be integral with the elastomeric cushioning element 102. Such a stretchable material is described in U.S. Patent Application Publication US 2017/0251825 A1, published on Sep. 7, 2017 and titled "Mattresses and Mattress Toppers Including Knitted Fabric, and Related Methods" ("the '825 Publication"), the entire disclosure of which is hereby incorporated herein. In yet other embodiments, the cushion 100 may comprise additional layers.

Figure 2:
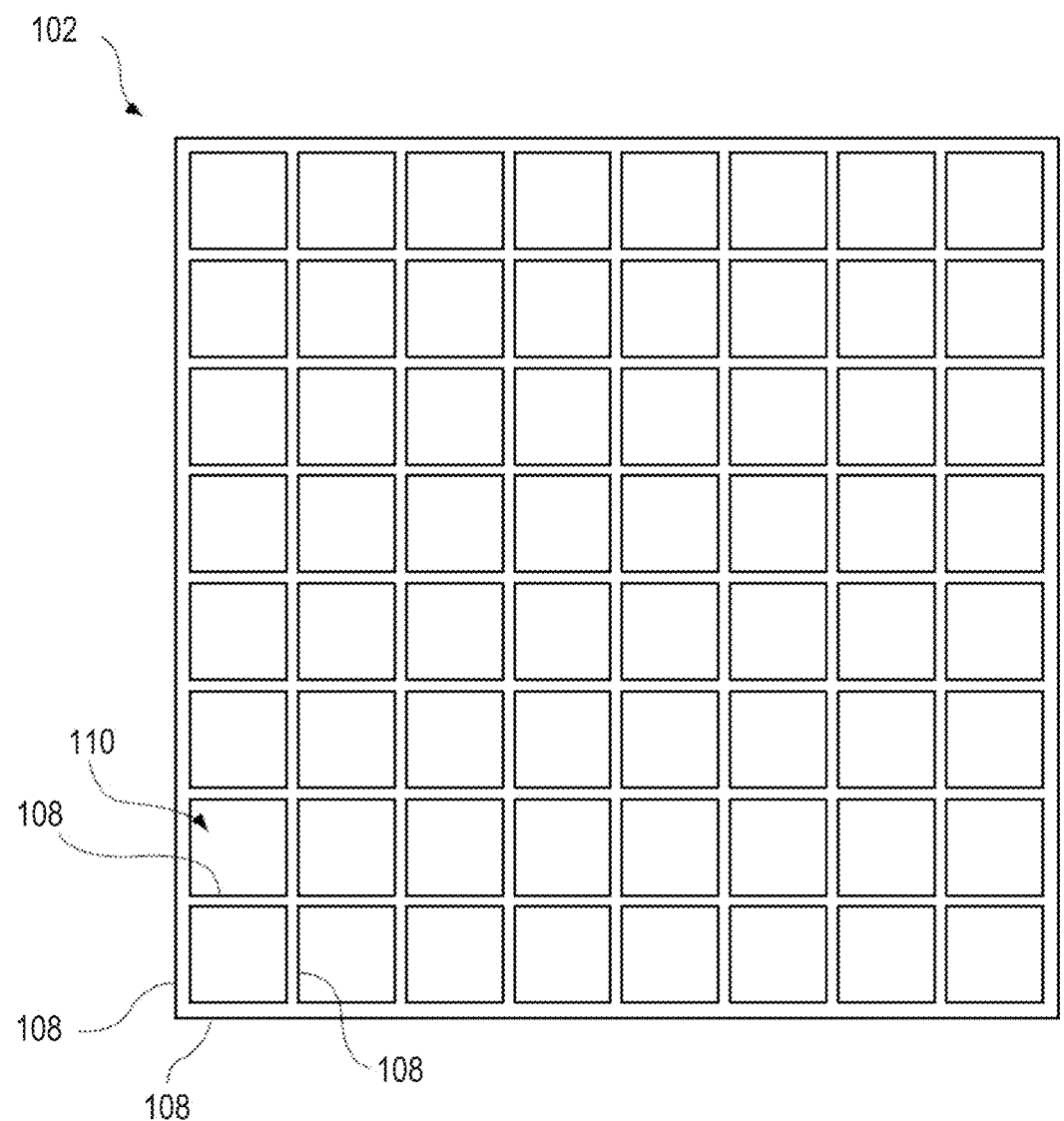
FIG. 2 is a top view of an elastomeric cushioning element of the cushion of FIG. 1 according to an embodiment of the present disclosure.

FIG. 2 illustrates a simplified top view of the elastomeric cushioning element 102 having buckling walls 108. The buckling walls 108 of the elastomeric cushioning element 102 may be interconnected to one another and may define hollow columns 110 or voids in an expanded form. As used herein, the term "expanded form" means and includes a state in which a cushioning element 102 has its original size and shape and wherein the buckling walls 108 are separated and define hollow columns 110.

FIG. 2 illustrates buckling walls 108 oriented in two directions, intersecting at right angles, and defining square voids 110. However, the buckling walls 108 may intersect at other angles and define voids 110 of other shapes, such as triangles, parallelograms, hexagons, etc. The elastomeric cushioning element 102 may comprise additional structures and configurations such as those structures and configurations described in, for example, U.S. Pat. No. 8,434,748, issued on May 7, 2013 and titled "Cushions Comprising Gel Springs;" U.S. Pat. No. 8,628,067, issued on Jan. 14, 2014 and titled "Cushions Comprising Core Structures and Related Methods;" U.S. Pat. No. 8,919,750, issued on Dec. 30, 2014 and titled "Cushioning Elements Comprising Buckling Walls and Methods of Forming Such Cushioning Elements;" and U.S. Pat. No. 8,932,692, issued on Jan. 13, 2015 and titled "Cushions Comprising Deformable Members and Related Methods," the entire disclosure of each of which is hereby incorporated herein.

The buckling walls 108 may be formed of an elastomeric material. Elastomeric materials are described in, for example, U.S. Pat. No. 5,994,450, issued and Nov. 30, 1999 and titled "Gelatinous Elastomer and Methods of Making and Using the Same and Articles Made Therefrom" ("the '450 patent"); U.S. Pat. No. 7,964,664, issued on Jun. 21, 2011 and titled "Gel with Wide Distribution of MW in Mid-Block;" U.S. Pat. No. 4,369,284, issued on Jan. 18, 1983 and titled "Thermoplastic Elastomer Gelatinous Compositions;" U.S. Pat. No. 8,919,750, issued on Dec. 30, 2014 and titled "Cushioning Elements Comprising Buckling Walls and Methods of Forming Such Cushioning Elements" ("the '750 patent"), the entire disclosure of each of which is hereby incorporated herein. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® 01650, and KRATON® 01651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset elastomers.

The elastomeric material may include one or more plasticizers, such as hydrocarbon fluids. For example, elastomeric materials may include aromatic-free food grade white paraffinic mineral oils, such as those sold by Sonneborn, Inc., of Mahwah, N.J., under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 4:1, by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., ofiselin, NJ or as EVERNOX®-10, from Everspring Corp. USA, of Los Angeles, Calif.; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single formulation of elastomeric material. The use of antioxidants in mixtures of plasticizers and polymers is described in columns 25 and 26 of the '450 patent. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the cushioning element 100 after deformation. The resin, if present, may include a hydrogenated pure monomer hydrocarbon resin, such as those commercially available from Eastman Chemical Company, of Kingsport, Tenn., under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide the cushioning element 102 with an appearance appealing to consumers. In addition, a cushioning element 102 having a dark color may absorb radiation differently than a cushioning element 102 having a light color.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The elastomeric material may include a material that may return to its original shape after deformation, and that may be elastically stretched. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5.

In some embodiments, the cushioning element 102 may be compressed. For example, the cushioning element 102 may be roll-packed into a cylindrical shape. Methods of roll packing a mattress are described in, for example, U.S. Pat. No. 8,046,973, titled "Machine for Packaging Mattresses," issued Nov. 1, 2011; U.S. Patent Application Publication US 2003/0074863 A1, published on Apr. 24, 2003 and titled "Method for Roll Packing Foam Cores;" U.S. Patent Application Publication US 2015/0203221 A1, published on Jul. 23, 2015 and titled "System and Method for Packaging a Foam Product;" and the '522 patent, the entire disclosure of each of which is hereby incorporated herein.

In some embodiments, the roll packing machine may apply a load sufficient to transform the cushioning element 102 to a compressed form. As used herein, the term "compressed form" means and includes a state in which the cushioning element 102 has a size and shape different from its original size and shape wherein adjacent buckling walls 108 are pressed together and may be collapsed such that voids 110 may not exist. As described in the '522 patent, the cushion 100 including the cushioning element 102 in compressed form may be packaged in a cylindrical bag and shipped to a customer. To use the cushion 100, the customer may remove the cushion 100 from the bag and allow the cushion 100 and the cushioning element 102 to return to its original size and shape.

It has been observed that the elastomeric material, according to embodiments of the present disclosure, may be sufficiently sticky such that the cushioning element 102 may not return to the expanded form after the cushion 100 is removed from the bag. That is, the buckling walls 108 may stick to one another or remain stuck to one another after the cushion 100 is removed from the bag. In some embodiments, the cushioning element 102 may not return to the expanded form within a reasonable amount of time (e.g., less than approximately eight hours). In other embodiments, the elastomeric cushioning element 102 may not return to the expanded form without manually or mechanically manipulating (e.g., pulling on) the cushioning element 102 to separate the buckling walls 108. However, when the cushioning element 102 is formed as part of the cushion 100, the layers 104, 106 may inhibit direct access to the elastomeric cushioning element 102 and may hinder manipulation of the elastomeric cushioning element 102 in order to separate the buckling walls 108. This sticking together of polymeric materials is referred to in the art as "blocking." To enable the elastomeric cushioning element 102 to return to the expanded form from the compressed form, a surface of the elastomeric cushioning element 102 may be coated with an olefin powder.

Figure 3:
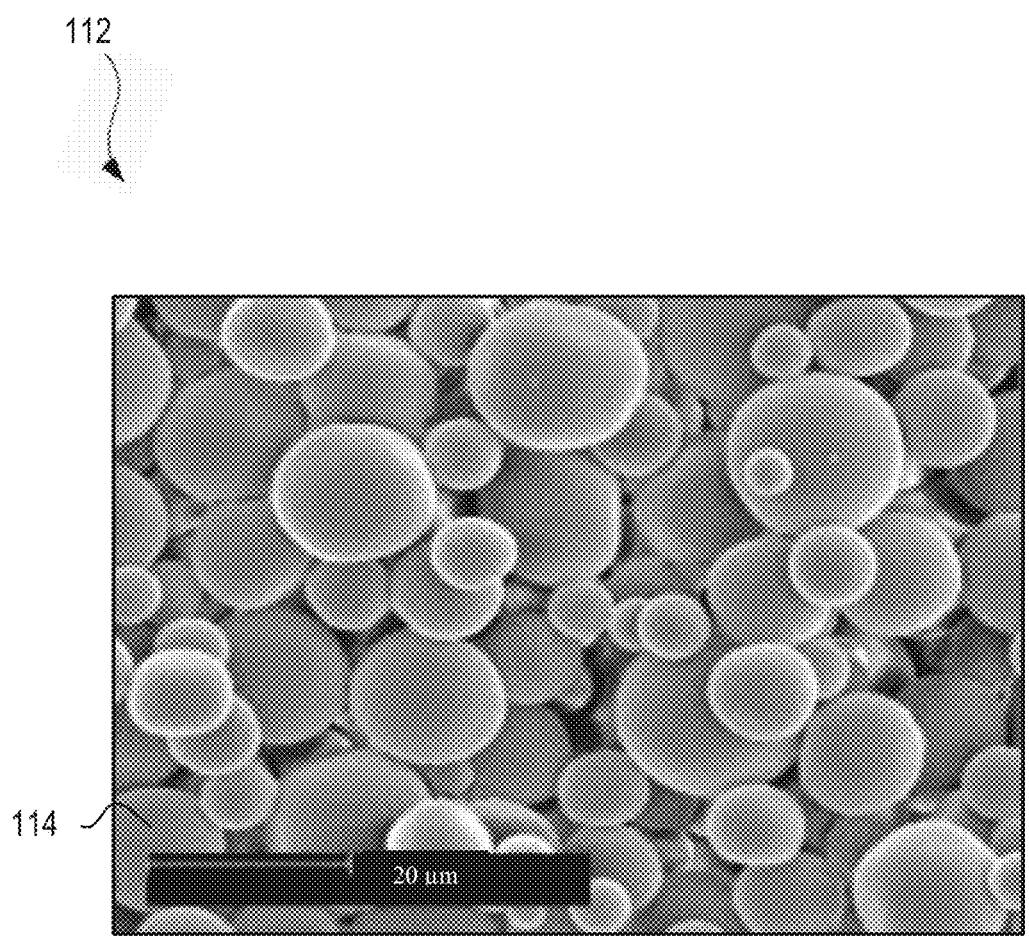
FIG. 3 is a micrograph of an olefin powder for coating the elastomeric cushioning element of FIG. 2 according to an embodiment of the present disclosure.

FIG. 3 is a photomicrograph of an olefin powder 112 used to coat a surface of the cushioning element 102 of FIGS. 1 and 2. The olefin powder 112 may be formulated to vary the stickiness or tackiness of the elastomeric material, such as to control the rate of response of the cushioning element 102 being unrolled and allowed to return to the expanded form after being roll packed. For example, the olefin powder 112 may be formulated to hinder adhesion of the elastomeric material of the cushioning element 102 when the cushioning element 102 is in the compressed form. In other words, the olefin powder 112 may be formulated as an anti-blocking agent, and may enable the cushioning element 102 to return the expanded form immediately or soon after the cushioning element is unrolled.

The olefin powder 112 may comprise particles 114 of olefin (e.g., alkene) polymer. The particles 114 may be substantially spherical. The particles 114 may have an average particle size of about 20 micrometers. The particle size may be in a range extending from about 5 micrometers to about 50 micrometers.

The olefin powder 112 may comprise high density polyethylene (HDPE). The olefin powder 112 may have a hardness on the Shore D scale of about 66. In some embodiments, the olefin powder 112 may be a powder such as those sold by LyondellBasell of Houston, Tex., under the trade name MICROTHENE® F Microfine Polymer Powder. For example, the olefin powder 112 may comprise MICROTHENE® FA70900.

Figure 4:
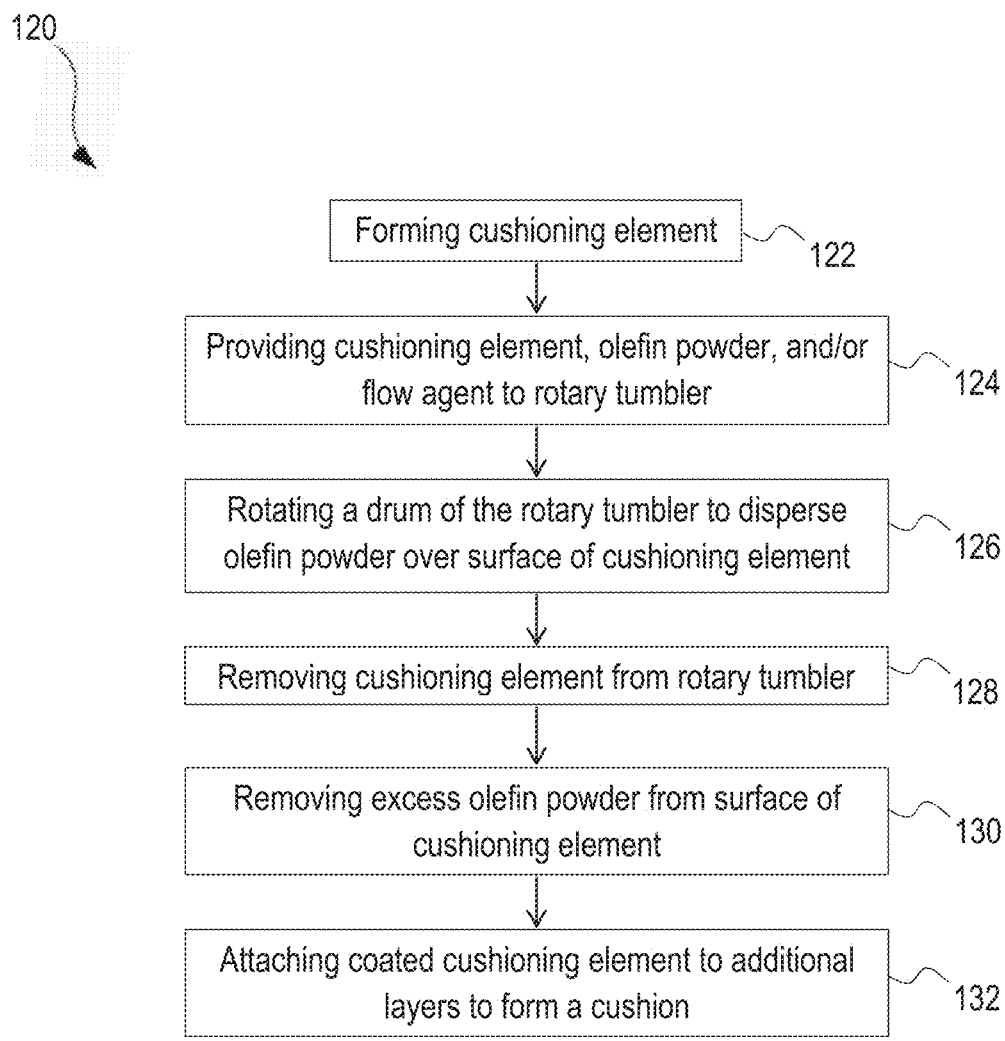
FIG. 4 is a flow chart of a method of forming a cushion according to an embodiment of the present disclosure.

FIG. 4 is a flow chart of a method 120 of coating a surface of the cushioning element 102 of FIG. 2 with the olefin powder 112 of FIG. 3 according to some embodiments. At action 122, the cushioning element 102 may be formed. In some embodiments, the cushioning element 102 may be molded. By way of non-limiting example, the cushioning elements 102 may be molded as described in the '750 patent. A molten elastomeric gel may be injected into a mold by the processes described in, for example, U.S. Pat. No. 7,666,341, issued on Feb. 23, 2010 and titled "Screed Mold Method," the entire disclosure of which is hereby incorporated herein. The buckling walls 108 may be formed by the injection of the molten elastomeric gel into the mold. The elastomeric gel may be solidified by cooling and removed from the mold to form the cushioning element 102.

At action 124, the cushioning element 102 and the olefin powder 112 may be provided (e.g., supplied) to a rotary tumbler. In some embodiments, the cushioning element 102 and olefin powder 112 may be provided to the rotary tumbler immediately or within about 180 minutes after the cushioning element 102 has been formed (e.g., removed from the mold). In other embodiments, the cushioning element 102 and olefin powder 112 may be provided to the rotary tumbler more than 180 minutes after the cushioning element 102 has been formed.

The rotary tumbler may include a cylindrical drum, which may be sized and configured to accommodate at least one cushioning element 102. In other embodiments, the drum may be sized and configured to accommodate at least four cushioning elements 102. The number of cushioning elements 102 that may be provided in the drum and simultaneously coated may depend on the dimensions of the cushion element 102.

The cushioning element 102 may have any selected dimensions based on the intended use. For example, if the cushion 100 is a mattress for a king size bed, the cushioning element 102 may be approximately 76 inches (193 cm) by about 80 inches (203 cm), with a thickness of approximately 2 inches (5.08 cm), and weigh approximately 80 lbs. If the cushion 100 is a mattress for queen size bed may be approximately 60 inches (152 cm) by 80 inches (203 cm), with a thickness of approximately 2 inches (5.08 cm), and weigh approximately 60 lbs. If the cushion 100 is a mattress for an extra-long twin size bed, the cushioning element 102 may be approximately 38 inches (96.5 cm) by 80 inches (203 cm), with a thickness of approximately 2 inches (5.08 cm), and weigh approximately 40 lbs.

In some embodiments, a flow agent may be provided in the olefin powder 112. The flow agent may comprise fumed silica. The flow agent may be formulated to prevent clumping of the olefin powder 112 on the surface of the cushioning element 102.

At action 126, the surfaces of the cushioning element 102, including the buckling walls 108, the top surface 103, and the bottom surface 105, may be coated. In some embodiments, the cushioning element 102 may be coated by rotating the drum. An interior surface of the drum includes ridges configured to prevent the cushioning element 102 from adhering to the interior surface of the drum. By rotating the drum, the cushioning element 102 may be tumbled and the olefin powder 112 dispersed at action 126. The drum may be rotated until a thin layer of the olefin powder 112 may be provided over (e.g., adhered to) substantially the entire surface of the cushioning element 102. For example, the drum may be rotated for less than 1 minute, for between 1 minute and 3 minutes, for between 3 minutes and 6 minutes, at least 10 minutes, between about 10 minutes and about 60 minutes, or for more than 60 minutes. The length of time for which the drum is rotated may vary based on the number and dimensions of the cushioning elements 102 provided in the drum.

In some embodiments, the direction of rotation of the drum may be varied during action 126. In other words, the drum may be rotated in each of a forward motion and a backward motion. In some embodiments, the drum may be rotated more in the backward motion than in the forward motion. In other embodiments, the drum may be rotated more in the forward motion than the backward motion. In yet other embodiments, the drum may be rotated equally in the forward motion and the backward motion. Rotating the drum in alternating directions may prevent the cushioning element 102 from rolling upon itself into, for example, a cylindrical shape, and may enable an even coating of the surface of the cushioning element 102. At action 128, the cushioning element 102 having a coating of olefin powder 112 thereon may be removed from the drum.

In other embodiments, the cushioning element 102 may be coated without using a rotary tumbler. For example, the olefin powder 112 may be sprayed onto the surface of the cushioning element 102. The olefin powder 112 may be sprayed using, for example, a compressed air sprayer. In other embodiments, the olefin powder 112 may be sprayed onto the surface of the cushioning element 102 by a spray-drying method. In yet further embodiments, the olefin powder 112 may be shaken or poured over a surface of the cushioning element 102. The olefin powder 112 may also be brushed or rubbed onto the surface of the cushioning element 102 mechanically or manually.

At action 130, excess olefin powder 112 may be removed from the cushioning element 102. In some embodiments, the excess olefin powder 112 may be removed by manually shaking or blowing on the cushioning element 102. In other embodiments, the olefin powder 112 may be removed mechanically by, for example, placing the coated cushioning element 102 in another rotary tumbler without olefin powder 112 disposed therein and rotating the drum of the rotary tumbler. In yet other embodiments, the excess olefin powder 112 may fall away from the cushioning element 102 naturally (e.g., without applying a manual or mechanical stimulus). The excess olefin powder 112 may be collected and reused to coat other cushioning elements 102.

In some embodiments, the olefin powder 112 provided on the cushioning element 102 may tint or discolor the surface of the cushioning element 102 such that it may be visibly discerned that the cushioning element 102 has been coated. In other embodiments, the olefin powder 112 provided on the cushioning element 102 may not be visible. In yet other embodiments, the olefin powder 112 may enhance the generally nonsticky feel of the surface of the cushioning element 102. Thus, it may be discerned by touching or rubbing the cushioning element 102 whether the cushioning element 102 has been coated with olefin powder 112.

In some embodiments, the cushioning element 102 may have an olefin powder-to-elastomeric material ratio from about 0.01:100 to about 3.0:100, by weight. In further embodiments, the cushioning element 102 may have an olefin powder-to-elastomeric material ratio of about 0.7:100, by weight.

At action 132, additional layers may be provided above and/or below the cushioning element 102. In some embodiments, the top layer 104 may be formed (e.g., attached) over the top surface 103 of the cushioning element 102, and the bottom layer 106 may be formed (e.g., attached) under the bottom surface 105 of the cushioning element 102.

Cushioning elements 102 described herein may have advantages over uncoated cushioning elements 102. For example, cushioning elements 102, which are coated with olefin powder 112 and provided in the cushion 100 that is subsequently roll-packed, packaged, and removed from the packaging, may return to the expanded form immediately and/or in less than eight hours. Further, the buckling walls 108 may separate without manual or mechanical forces being applied. This quick expansion may allow for immediate use of the cushion 100.

Comparative Examples

In experiments conducted by the inventor, a cushion having an elastomeric cushioning element without any coating provided on a surface thereof was roll-packed by the process as described in the '522 patent. After the cushion was roll-packed in the compressed form, the cushion was packaged, and subsequently removed from the packaging such that the cushion could return to its original size and shape. However, the cushion failed to return to its original size and shape within eight hours. In other similar experiments conducted on cushions including an uncoated elastomeric cushioning element, some cushions failed to return to the original size and shape within 30 days, and other cushions never returned to the original size and shape without manually pulling apart the buckling walls.

In other experiments conducted by the inventor, an elastomeric cushioning element was coated with a talc powder, which is a common antiblock additive. The cushion including the talc-coated cushioning element, was similarly roll-packed, packaged, and subsequently removed from the packaging such that the cushion could return to its original size and shape. Similar to the uncoated elastomeric cushioning element, the buckling walls of the cushion did not unstick, and the cushion failed to return to its original size and shape within eight hours. Generally, no improvement was observed between the uncoated elastomeric cushioning element and the talc-coated elastomeric cushioning element.

In yet further experiments conducted by the inventor, an elastomeric cushioning element was coated with surfactants such as glycerin and DAWN® dishwashing liquid. The cushion including the surfactant-coated cushioning element, was similarly roll-packed, packaged, and subsequently removed from the packaging such that the cushion could return to its original size and shape. Similar to the uncoated and talc-coated elastomeric cushioning element, the buckling walls of the cushion did not unstick, and the cushion failed to return to its original size and shape within eight hours. Generally, no improvement was observed between the surfactant coated elastomeric cushioning element, the uncoated elastomeric cushioning element, and the talc-coated elastomeric cushioning element.

Working Example

A mattress as illustrated in FIG. 1 was formed in accordance with a method as described herein. The mattress included an elastomeric cushioning element formed of an elastomeric mixture of plasticizer and polymer. The mixture included a plasticizer-to-polymer ratio of 4:1, by weight. The plasticizer comprised 70-weight oil, and the polymer comprised KRATON® E1830. The mixture also included pigment and antioxidants. The elastomeric mixture was subsequently provided with a filler. The filler comprised approximately 17% by volume hollow glass microspheres having a specific gravity of 0.4. The cushioning element formed of the elastomeric mixture and filler was coated with MICROTHENE® FA70900 powder comprising HDPE by disposing the cushioning element in a rotary tumbler having MICROTHENE® FA70900 powder disposed therein. To coat the cushioning element, a drum of the rotary tumbler was rotated for about 2 minutes. The cushioning element was removed from the rotary tumbler, and the excess powder was manually shaken off. The cushioning element was formed as part of the mattress by attaching the cushioning element to foam layers and inserting the cushioning element and foam layers in a knitted fabric as described in the '825

Publication. The mattress was roll packaged, left in a roll-packed state for 30 days, and subsequently unpackaged. Once unpackaged, the mattress was unrolled and allowed to return to its original size and shape (e.g., the expanded form). The mattress and, more particularly, the cushioning element coated with MICROTHENE® FA70900 powder returned to the expanded form immediately or at least in less than eight hours without manually or mechanically pulling the buckling walls apart.

While the certain embodiments have been described, those of ordinary skill in the art will recognize and appreciate that the scopes of the claims should not be so limited. Rather, many additions, deletions, and modifications to the illustrated embodiments may be made without departing from the scope of any of the following claims, including legal equivalents thereof. In addition, features from one embodiment may be combined with features of another embodiment while still being encompassed within the scope of the disclosure, as contemplated by the inventors.

What is claimed:

1. A method for packaging a mattress, comprising:
   coating surfaces of a cushioning element of the mattress that comprise an elastomeric material comprising an oil-extended elastomeric polymer with an olefin powder while the cushioning element is substantially in an expanded state, the cushioning element comprising walls defining hollow columns, the surfaces of the cushioning element comprising surfaces of the walls; and
   compressing the mattress, including the cushioning element, from the expanded state into a compressed state by collapsing the hollow columns and bringing the surfaces of the walls into contact with each other, the powder preventing the surfaces of the walls from adhering to each other.

2. The method of claim 1, wherein compressing the cushion comprises roll-packing the cushion.

3. The method of claim 1, wherein coating the surfaces of the cushioning element with the olefin powder comprises coating the surfaces of the cushioning element with a high density polyethylene powder.

4. The method of claim 1, further comprising:
   coating the surfaces of the cushioning element with hollow microspheres.

5. The method of claim 1, further comprising:
   injection molding the cushioning element from the oil-extended elastomeric polymer.

6. The method of claim 5, wherein coating the surfaces of the cushioning element comprises coating the surfaces of the cushioning element within 180 minutes of injection molding the cushioning element.

7. The method of claim 1, wherein coating the surfaces of the cushioning element comprises coating the surfaces of the cushioning element with the olefin powder and the cushioning element having a weight ratio of about 0.01:100 to about 3.0:100.

8. The method of claim 7, wherein coating the surfaces of the cushioning element comprises coating the surfaces of the cushioning element with the olefin powder and the cushioning element having a weight ratio of about 0.7:100.

9. The method of claim 1, wherein coating the surfaces of the cushioning element comprises tumbling the cushioning element with the olefin powder.

10. The method of claim 1, further comprising:
    removing excess powder from the surfaces of the cushioning element.

11. The method of claim 10, wherein removing the excess powder from the surfaces of the cushioning element comprises tumbling the cushioning element without powder.

12. The method of claim 1, further comprising:
    removing a compressive force from the cushion, the cushion substantially immediately returning substantially to the expanded state.

13. A method for packaging a mattress, the method comprising:
    manufacturing a cushioning element of a mattress from an elastomeric material comprising an elastomeric polymer extended with an oil, the elastomeric material defining intersecting walls defining a plurality of hollow buckling columns;
    coating surfaces of the cushioning element of the mattress, including surfaces defining the plurality of hollow buckling columns, with a powder within about 180 minutes of manufacturing the cushioning element and while the cushioning element is substantially in an expanded state; and
    compressing the mattress, including the cushioning element, from the expanded state into a compressed state, the powder preventing surfaces of the cushioning element that are brought into contact with each other while compressing the cushion from adhering to each other.

14. The method of claim 13, wherein manufacturing the cushioning element comprises injection molding the cushioning element from the elastomeric material.

15. The method of claim 13, wherein coating the surfaces of the cushioning element comprises tumbling the cushioning element with the powder.

16. The method of claim 13, further comprising:
    removing excess powder from the cushioning element.

17. The method of claim 13, further comprising:
    removing a compressive force from the cushion, the cushion substantially immediately returning substantially to the expanded state.

* * * * *